Jan. 21, 1930.  E. VAN NOORDEN  1,744,181
ATTACHMENT FOR DAMPERS
Filed April 19, 1929  2 Sheets-Sheet 1
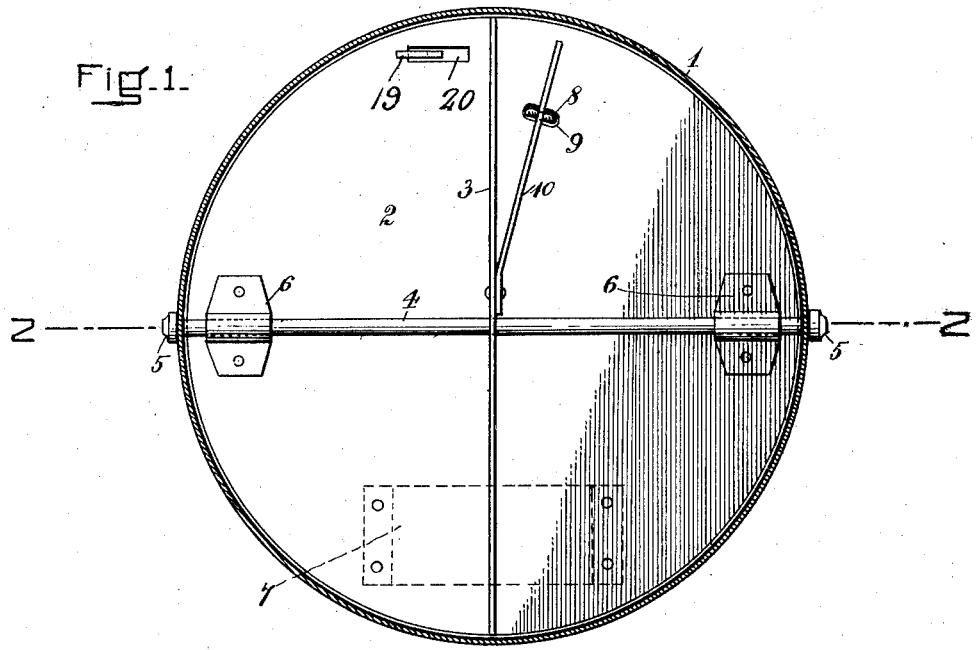
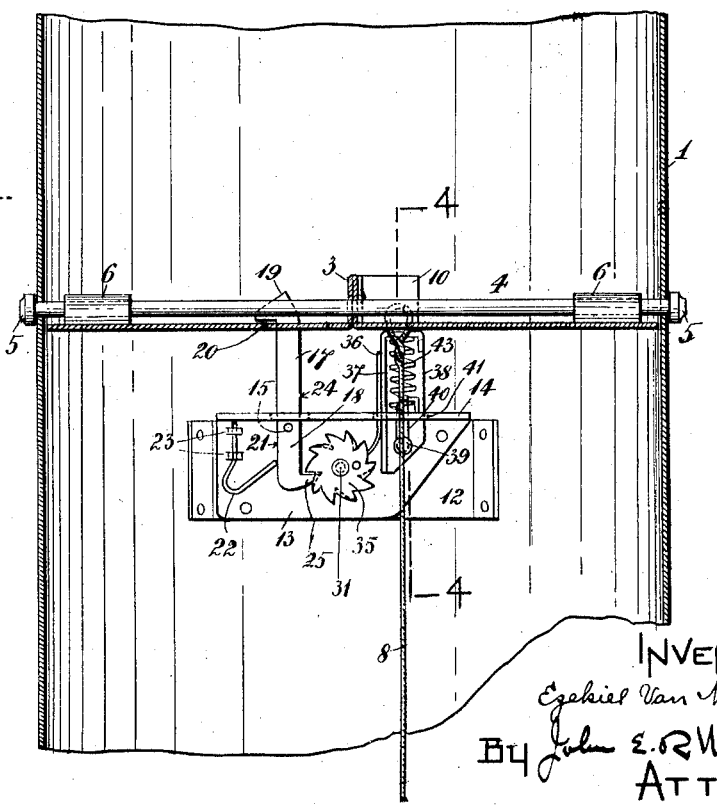
INVENTOR:
Ezekiel Van Noorden
BY John E. R. Meyer
ATTORNEY Jan. 21, 1930.  E. VAN NOORDEN  1,744,181
ATTACHMENT FOR DAMPERS
Filed April 19, 1929   2 Sheets-Sheet 2

INVENTOR:
Ezekiel Van Noorden
By John R. Hayes
ATTORNEY:

Patented Jan. 21, 1930

1,744,181

UNITED STATES PATENT OFFICE

EZEKIEL VAN NOORDEN, OF BROOKLINE, MASSACHUSETTS

ATTACHMENT FOR DAMPERS

Application filed April 19, 1929. Serial No. 356,339.

The invention relates to an attachment for controlling the opening and closure of dampers and especially dampers arranged in an out-of-the-way position not easily accessible. The object of the invention is to provide an arrangement by which the damper is controlled for opening and closing it by successive pulls on a single cord having any desired extension.

While the attachment may be used with dampers employed under a great variety of conditions, yet the attachment is especially adaptable for dampers controlling ventilator openings, and it is accordingly shown in the drawings in such connection, where—

Figure 1 is a view partly in cross section and partly in plan of a ventilator pipe and damper in it fitted with the present attachment, the damper occupying a closed position.

Fig. 2 is a vertical section on the line 2—2 of Fig. 1.

In the drawings:—

Figure 3:
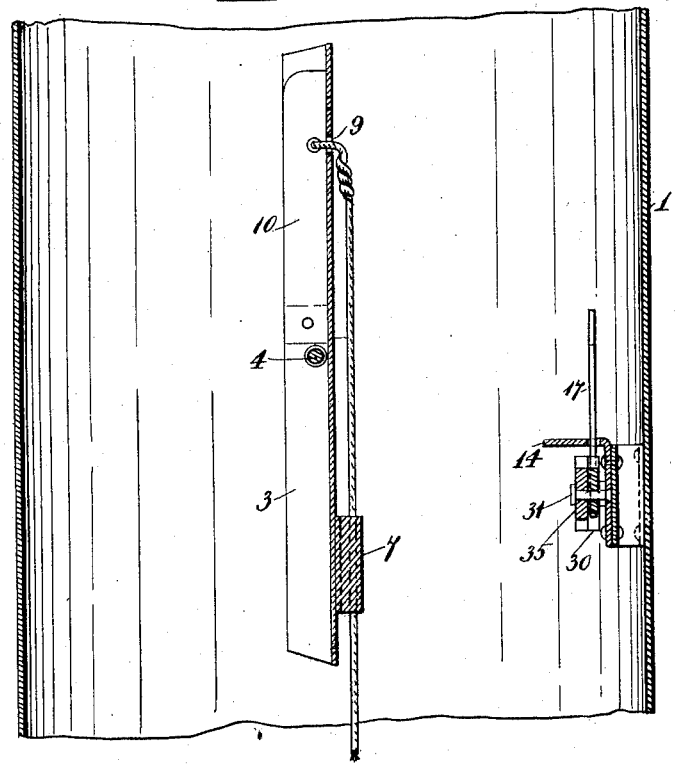
Fig. 3 is a vertical section of the pipe, damper and operating parts, the damper being shown in open position.
Figure 4:
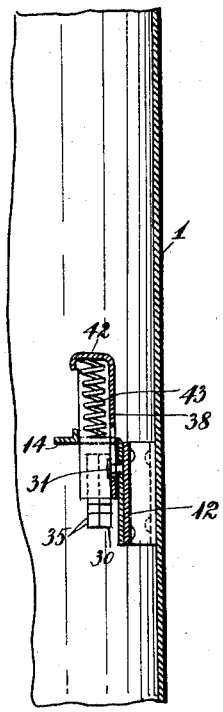
Fig. 4 is a section on the line 4—4 of Fig. 2.

1 represents the pipe or casing, preferably circular in form, within which the damper is arranged to control by its opening and closure the opening through the pipe. 2 is the damper. This is preferably of sheet metal upset along its centre to form a rib 3 upstanding from the face of the damper and acting to reinforce it. Extending diametrically over the face of the damper with ends projecting through the opposite sides of the pipe is a rod 4 on which the damper is mounted to turn. The ends of the rod thus projecting preferably have a tight fit within the openings in the pipe through which they extend, and are preferably provided with heads 5 outside the pipe preventing endwise displacement of the rod in case it should become loose within the openings through which it extends. The damper is mounted to turn upon the rod 4 by the rod extending through the rib 3 on the face of the damper and also through hinge-forming straps 6 passed around the rod and fastened to the damper as by riveting. The damper is made to maintain a normal open position by means of a weight 7 located adjacent its edge on one side thereof. On account of this weight the damper when closed will return to an open position if unrestricted.

For drawing the damper into an open position against the force of its overbalancing weight a cord 8 is provided. This cord is brought up from below the damper, passed upward through the unweighted side thereof and fastened so that pull upon the cord will operate to close the damper. The fastening of the end of the cord to the damper is preferably obtained by passing the end of the cord upward through an opening 9 in the damper, thence laterally through a bar 10 fixed to the rib 3 and thence back through the opening 9, and the end is then tied to the body of the cord. This forms a convenient mode of fastening and relieves the damper from direct strain which comes upon the bar 10. The cord 8 may have any desired extension.

Having provided means for closing the damper, which effect is obtained by a pull upon the cord 8, reference will now be made to mechanism by which the closed position of the damper will be defined and maintained and afterward the damper be released to open by another successive pull upon the cord 8.

Fastened preferably by riveting to the interior wall of the pipe or casing 1 on the side thereof beneath the unweighted side of the damper when the damper is occupying a closed position, is a plate 12. Overlying this plate and fastened to it as by riveting is a second plate 13 having a flange 14 inturned from its top edge. Pivotally mounted on the plate 14 by a stud 15 is a latch-carrying lever 16 which is retained, as will presently be explained, in a generally upright or vertical position with a permitted slight degree of swinging to and away from what will afterward be referred to as its engaging and disengaging positions. 17 represents the arm of the lever lying above its pivotal point and 18 the arm of the lever lying below its pivotal point.

The arm 17 of the lever has upon its top end a latch 19. In length the arm 17 is such that it will extend upward through a slot 20 in the damper when in a closed position, and the latch 19 on the top end of the arm will lie just above the damper so that as the lever is swung to its engaging position the latch will overlap the damper adjacent the slot in it and by its bearing hold the damper in a closed position. The slot 20 in the damper is sufficiently large to permit of the latch 19 passing through it so that when the lever is in its disengaging position and the damper is being swung to a closed position, the damper will swing down over the latch permitted by the slot in the damper, the latch then passing through the slot. When the damper has reached a fully closed position then the latch will lie above the slot and top face of the damper and, the lever then being swung into an engaging position, the latch will overlap the damper as aforesaid for holding the damper closed.

Figure 5:
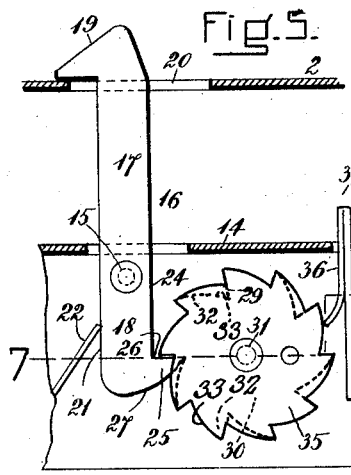
Figs. 5 and 6 are views mainly in side elevation of those portions of the operating mechanism which are fixed to the pipe and are illustrative of the manner in which certain parts thereof co-ordinate with the damper for holding it in a closed position or admit of its opening.
Figure 6:
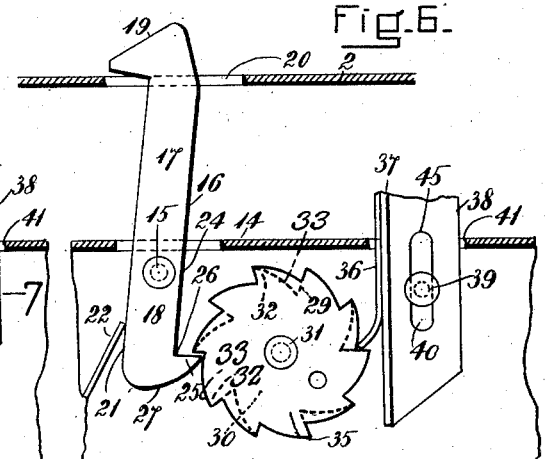
Figure 7:
Fig. 7 is a cross section on the line 7—7 of Fig. 5.

The arm 18 of the lever lying below its pivotal point extends downward over the face of the plate 13. Bearing against the side 21 of the arm thus projecting is a spring 22 which normally operates to swing the lever and maintain it and the latch carried by it in an engaging position. The spring 22 secured to the plate 13 in any suitable manner as by passing the fixed end of the spring through cleats 23 formed on the plate. Projecting laterally from the lower end of the arm 18 and outstanding from the side 24 thereof, opposite the side 21 against which the spring has a bearing, is an offset 25 presenting on the top edge thereof a straight edge 26 and on the bottom edge thereof a rounding or cam-forming edge 27 meeting the top edge to form the outer end or point of the offset. The offset thus formed and projecting is adapted to fit into notches 29 of successive varying depth formed within a stop-forming wheel 30 turning on a stud 31 fixed to the plate 13. The wheel 30 is arranged laterally adjacent the offset with the effect that when the offset is fitting within notches of the greater depth, as shown in Fig. 5, the lever will be permitted to swing into an engaging position so that the latch carried by it will engage the damper for holding it closed as previously explained. On the other hand, when the offset 25 is fitting within notches of lesser depth, as shown in Fig. 6, then the lever will be maintained to occupy its disengaging position and the latch carried by it will lie out of engagement with the damper for holding it closed. The notches 29 are formed by and between teeth 32 arranged around the peripheral edge of the wheel 30, these teeth having respectively greater or less projection to form the notches of varying depth as aforesaid. The teeth are arranged in successive order, a larger tooth followed by a smaller tooth to form corresponding larger and smaller notches, one of larger depth followed by one of lesser depth, so that as the wheel 30 is turned periodically in a clockwise direction and in an amount permitting the offset 25 on the end of the lever to occupy in turn successive notches, the lever arm and latch carried by it will be permitted to have engaging and disengaging positions with relation to the damper. The action of the offset 25 on the lever fitting snugly into the various notches as the wheel 30 is turned is facilitated by the outer edges 33 of the teeth drawing against the bottom cam-forming edge 27 of the offset until the tooth draws over the end of the offset when the offset will fall into the notch beneath the tooth, the offset being at all times propelled in the direction of the wheel 30 and notches within it by the tension of the spring 22 bearing against the arm 18 of the lever.

The stop-forming wheel 30 is intermittently turned so that the offset 25 will enter its successive notches 29 by means of a ratchet wheel 35 fixed to the wheel 30 and rotating with it, the stop-forming wheel 30 being turned as the ratchet wheel is turned. Intermittent rotary motion is imparted to the ratchet wheel 35 by a pallet 36 attached to the turned edge 37 of a vertically-arranged reciprocating slide 38. The slide 38 is secured to the plate 13 by a headed pin 39 fixed to the plate 13 and passing through a slot 40 in the slide. The slide 38 and its turned edge 37 pass upward through an angular slot 41 cut in the flange 14 on the top edge of the plate 13. The slide extends upward well beyond the flange 14 and at its top end is provided with a turned edge 42 forming a head. Arranged between the head 42 and the flange 14 is a coiled spring 43 which normally operates to lift the slide and maintain it in a raised position limited by the drawing of the bottom edge of the slot 40 in the slide against the pin 39. When occupying this position the upward extension of the slide beyond the flange 14 is such that the head 42 of the slide will be engaged by the damper when the damper is being drawn into a closed position. The pressure thus exerted by the closing damper operates to depress or throw down the slide, overcoming the tension of the spring, and consequently the motion thus imparted to the slide will, through the pallet 36, operate to turn the ratchet 35. On account of the top end 45 of the slot in the slide being brought into engagement with the pin 39 the slide will only have a limited downward movement when thrown down by draft upon the damper and this movement is just sufficient to turn the ratchet wheel 35 in an amount equal to the distance between the notches on the wheel 30 into which the offset 25 falls so that the offset will fall into successive notches as the slide is successively depressed. The length of the slot 40, in other words, determines the extent of downward movement of the slide and consequently the extent of rotary movement imparted to the ratchet wheel 35 and stop-forming wheel 30 controlled by it.

The general operation is as follows: It will first be assumed that the damper is open. Pull is now made upon the cord 8 for closing the damper. As the damper approaches its closed position its unweighted side to which the cord is attached will draw against the head 42 of the slide 38 and as pull upon the cord is continued the slide will be thrown down compressing the spring 43. The downward movement of the slide continues until the top end 45 of the slot 40 in the slide engages the pin 39. The downward movement of the slide thus effected is just sufficient, through the operation of the pallet 36 and ratchet wheel 35, to turn the stop-forming wheel 30 so that the offset 25 on the lever 16 will enter one of the deeper notches 29 in the stop-forming wheel. The lever 16 will then be permitted to occupy an engaging position as shown in Fig. 5 and the latch upon the top end thereof an engaging position to the damper then turned slightly beyond its normal closed position. Pull upon the cord 8 then being released, the spring 43 will operate to elevate the slide and raise the unweighted side of the damper then slightly depressed until it is brought into engagement with the latch then occupying an engaging position, and this corresponds with the proper normal closed position of the damper. On the other hand, release of the damper to open is obtained by another successive pull upon the cord 8. As pull is made upon the cord, the damper then occupying a closed position, the unweighted side of the damper will be pulled down, thereby depressing the slide the same as before, and consequently the slide through the attached pallet 36 will operate through the ratchet wheel 35 to move the stop-forming wheel 30 in just such proper amount that the offset 25 on the lever 16 will fit into the next succeeding notch 29 on the stop-forming wheel, which is a notch of lesser depth, and consequently the lever and latch carried by it will be made to occupy a disengaging position with relation to the damper. Therefore when the cord 8 is released the slide will be released to occupy its normal elevated position as defined by the engagement of the bottom end of its slot 40 with the pin 39, and the damper then unimpeded by the latch, occupying a disengaging position as aforesaid, will on account of the overweighting thereof, simply swing to an open position. This operation for opening and closing the damper is simply repeated as successive pulls are made upon the cord.

Even though the damper may be arranged in an out-of-the-way position and entirely out of sight, it can be easily determined whether it is closed or open on account of the fact that when the damper is closed the cord 8 will have longer extension than when it is open, the opening of the damper tending to draw up the cord inasmuch as it is attached to the unweighted side of the damper which occupies an elevated position when the damper is open.

Having thus fully described my invention, I claim and desire to secure by Letters Patent of the United States:—

1. The combination with a damper casing having a damper within it for controlling the opening through the casing, said damper being pivotally arranged and overweighted on one side thereof by which it will assume a primary normal position in relation to said opening, of a flexible pull connection connected with the unweighted side of the damper by which it may be turned by pull upon said connection to a secondary position with relation to said opening, mechanism whereby said damper may be locked in its secondary position or released to assume its normal primary position by successive pulls upon said connection, said mechanism comprising a latch adapted to have an engaging position with relation to the damper for holding it in place or a disengaging position in relation thereto for releasing it, means for controlling the engaging or disengaging positions of the latch, and means operated by pull upon said flexible connection for governing said last-mentioned means.

2. The combination with a damper casing having a damper within it for controlling the opening through the casing, said damper being pivotally arranged and overweighted on one side thereof by which it will assume a primary normal position in relation to said opening, of a flexible pull connection connected with the unweighted side of the damper by which it may be turned by pull upon said connection to a secondary position with relation to said opening, mechanism whereby said damper may be locked in its secondary position or released to assume its normal primary position by successive pulls upon said connection, said mechanism comprising a latch adapted to have an engaging position with relation to the damper for holding it in place or a disengaging position in relation thereto for releasing it, means for controlling the engaging or disengaging positions of the latch, and means operated by successive pulls upon said flexible connection governing said last-named means whereby the latch by one pull upon said flexible connection will be controlled to have an engaging position for holding the damper in place when moved into its secondary position as aforesaid, and by a successive pull upon said flexible connection the latch will be controlled to have a disengaging position with relation to said damper for releasing the damper from its secondary position to assume its normal primary position.

3. The combination with a damper casing having a damper within it for controlling the opening through the casing, said damper being pivotally arranged and overweighted on one side thereof by which it will assume a primary normal position in relation to said opening, of a flexible pull connection connected with the unweighted side of the damper by which it may be turned by pull upon said connection to a secondary position with relation to said opening, mechanism whereby said damper may be locked in its secondary position or released to assume its normal primary position by successive pulls upon said connection, means for mounting said mechanism in position beneath the unweighted side of the damper when the damper is occupying its secondary position, said mechanism comprising a latch adapted to have an engaging position with the damper for holding it in place or a disengaging position in relation thereto for releasing it, means for controlling the engaging or disengaging positions of the latch, and means for governing said last-named means operated by the thrust of the unweighted side of the damper when moved by pull upon said flexible connection.

4. The combination with a damper casing having a damper within it controlling the opening through the casing, said damper being pivotally arranged and overweighted on one side thereof by which it will assume a primary normal position in relation to said opening, of a flexible pull connection connected with the unweighted side of the damper by which it may be turned by pull upon said connection to a secondary position with relation to said opening, said damper having in the unweighted side thereof a slot, mechanism whereby said damper may be locked in its secondary position or released to assume its primary normal position by successive pulls upon said flexible connection, means for mounting said mechanism beneath the unweighted side of the damper and the slot therein when the damper is in its secondary position, said mechanism comprising a latch adapted and arranged whereby it will pass through said slot in the unweighted side of the damper as the damper is moved into its secondary position and the latch then having an engaging position with relation to the damper for holding it in place or a disengaging position in relation thereto for releasing it, means for controlling the engaging or disengaging positions of the latch, and means for governing said last-named means operated by the thrust of the unweighted side of the damper when moved by pull upon said flexible connection.

5. The combination with a damper casing having a damper within it controlling the opening through the casing, said damper being pivotally arranged and overweighted on one side thereof by which it will assume a primary normal position in relation to said opening, of a flexible pull connection connected with the unweighted side of the damper by which it may be turned by pull upon said connection to a secondary position with relation to said opening, said damper having in the unweighted side thereof a slot, mechanism whereby said damper may be locked in its secondary position or released to assume its primary normal position by successive pulls upon said flexible connection, means for mounting said mechanism beneath the unweighted side of the damper and the slot therein when the damper is in its secondary position, said mechanism comprising a pivoted lever, a latch borne by the lever adapted and arranged whereby it will pass through said slot in the unweighted side of the damper as the damper is moved into its secondary position and the latch then have an engaging position with relation to the damper for holding it in place or a disengaging position in relation thereto for releasing it, means for controlling the position of said lever and thereby the engaging or disengaging positions of the latch, and means for governing said last-named means operated by the thrust of the unweighted side of the damper when moved by pull upon the flexible connection.

6. The combination with a damper casing having a damper within it controlling the opening through the casing, said damper being pivotally arranged and overweighted on one side thereof by which it will assume a primary normal position in relation to said opening, of a flexible pull connection connected with the unweighted side of the damper by which it may be turned by pull upon said connection to a secondary position with relation to said opening, said damper having in the unweighted side thereof a slot, mechanism whereby said damper may be locked in its secondary position or released to assume its primary normal position by successive pulls upon said flexible connection, means for mounting said mechanism beneath the unweighted side of the damper and the slot therein when the damper is in its secondary position, said mechanism comprising a pivoted lever, a latch borne by the lever adapted and arranged whereby it will pass through said slot in the unweighted side of the damper as the damper is moved into its secondary position and the latch then have an engaging position with relation to the damper for holding it in place or a disengaging position in relation thereto for releasing it, a tension means engaging the lever for holding the latch in a normal engaging position, a notched stop-forming wheel opposing said tension means and engaged by said lever, and means for intermittently turning said wheel operated by thrust of the unweighted side of the damper when moved by pull upon the flexible connection.

EZEKIEL VAN NOORDEN.